March 13, 1934.    P. F. SCOFIELD    1,950,754
MAGNETO
Filed Dec. 9, 1932
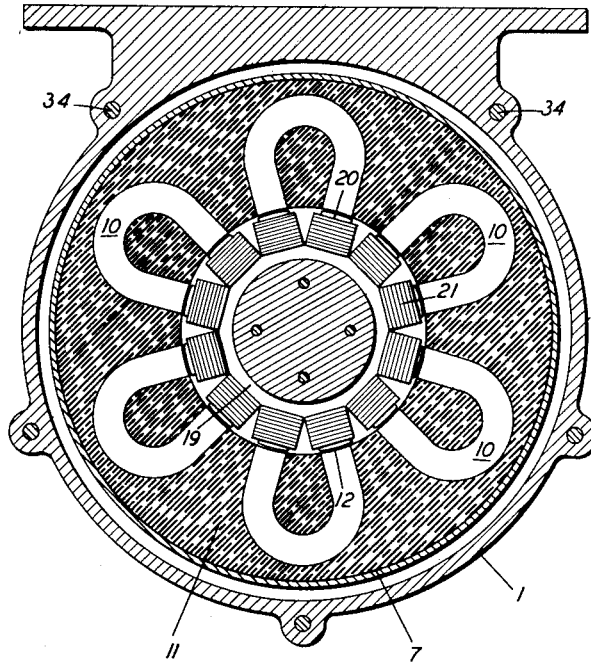
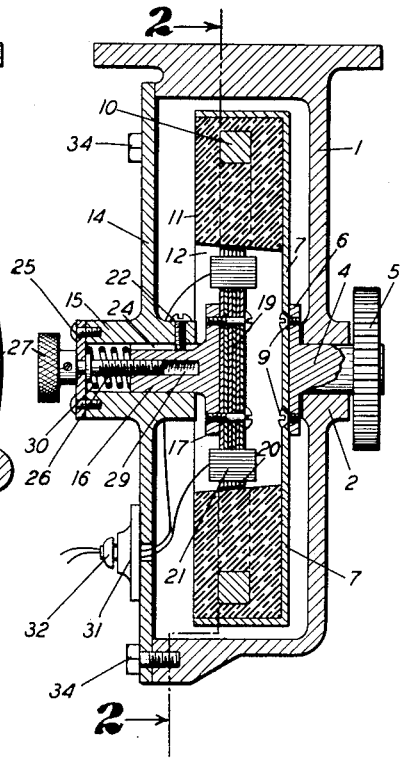
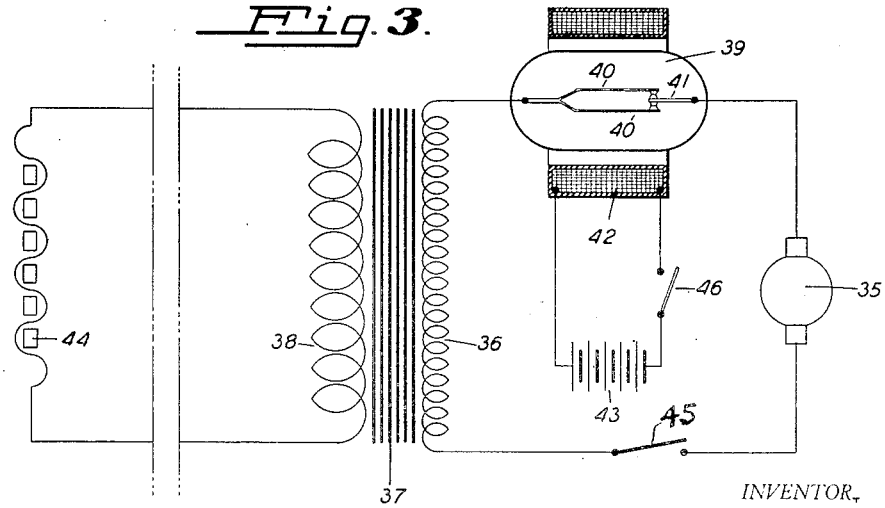
INVENTOR,
PHILIP F. SCOFIELD.
BY Donald K. Lippincott
ATTORNEY Patented Mar. 13, 1934

1,950,754

UNITED STATES PATENT OFFICE 1,950,754

MAGNETO

Philip F. Scofield, Palo Alto, Calif., assignor to Heintz & Kaufman, Ltd., San Francisco, Calif., a corporation of Nevada Application December 9, 1932, Serial No. 646,412

4 Claims. (Cl. 171—252)

My invention relates to a magneto, and more particularly to a magneto having a permanent magnet field and an armature which can be utilized to charge the magnetic elements of the field.

Among the objects of my invention are: To provide a simple and efficient method of magnetizing the field elements of a magneto; to provide means for closing the air gap between the field and the armature of a magneto so that the current may be passed through the armature to magnetize the field elements; to provide means for passing a heavy instantaneous current through an armature to charge or magnetize opposed field elements in a magneto; and to provide means for regulating the air gap in a magneto to facilitate charging of the field elements by passing current through the armature windings.

Other objects of my invention will be apparent or will be specifically pointed out in the description forming a part of this specification, but I do not limit myself to the embodiment of my invention herein described, as various forms may be adopted within the scope of the claims.

In the drawing, Figure 1 is a longitudinal sectional view of a magneto generator having an adjustable air gap.

Figure 2 is a cross-sectional view taken along a plane indicated by the line 2—2 in Figure 1.

Figure 3 is a schematic diagram of a circuit giving a high instantaneous charging current.

With the advent of cobalt chrome magnet steel, permanent magnets may be made having flux densities high enough for use in magneto or inductor alternator fields, with efficiencies comparable to those using current energized field structures. It is, however, difficult to charge or magnetize the magnetic elements to their upper limit, and only high charging currents will do satisfactory work. It is also desirable to have a complete and efficient magnetic circuit while charging, and as a portion of the charge is lost when the magnetic circuit is first broken, it is important that field magnets be charged in place in the generator if possible.

Broadly speaking, my invention comprises an alternator having a field of a plurality of permanently magnetizable elements, preferably formed of cobalt-chrome magnet steel, rotating or oscillating adjacent an armature.

Means are provided for closing the air gap between the armature core and the salient poles of the magnets, and after the gap has been closed, a heavy instantaneous current is passed through the armature coils. The magnets thereupon become charged, and the air gap is restored to its original, or operating position. It is possible, by using the field collapse of a large transformer, to pass an instantaneous current through the armature coils, much larger than the coils could stand over any appreciable length of time without overheating.

Referring to the drawing, in which a preferred form of rotating field-inductor alternator is shown, a generator casing 1 is provided with an end bearing 2 in which is mounted a generator shaft 4. Outside the casing the shaft is fitted to a drive gear 5 which may transmit power from any type of prime mover. It is obvious that any means may be used to drive the generator at the proper speed, and the prime mover may be direct coupled, belted or otherwise connected to the generator shaft.

Inside the casing the shaft has an integral drive flange 6 on which is fastened a field web 7 by screws 9. This web is in the form of a cap and supports the field elements 10, preferably by molding the elements in a phenolithic condensation plastic, bonded, or otherwise fastened to the web. These elements preferably six in number are horse shoe shaped, and have twelve equally spaced salient poles having their faces on the armature channel 12. The field magnets are preferably formed from high quality cobalt-chrome magnet steel and molded into the field structure before being fully charged.

The inner armature channel face is coned at a small angle, the end of the channel toward the web 7 being the smallest. This operation is usually done by grinding, as the magnet steel is too hard to machine otherwise. If other means are used to hold the magnetic elements in place, only the pole faces need be machined to describe a coned surface.

A casing cover 14 is provided with a hollow boss 15, in which an armature support 16 fits closely. This support has an inner armature mounting flange 17 to which a laminated armature core 19 having outwardly projecting core extensions 20, twelve in number, on which armature coils 21 are mounted.

The core extensions 20 are also machined to describe a cone, complementary to that of the field pole faces, so that when the entire armature is moved toward the drive web, the cones will fit each other exactly.

The armature support 16 slides in the boss 15, and is kept from turning by a stud 22 extending into a slot 24. A stud cap 25 carries a progression screw 26, having a hand wheel 27 on its outer end, and having its inner end threaded into a central bore 29 in the armature support. A spring 30 gives freedom from backlash.

The armature coils are preferably connected in series, and the leads brought out to a receptacle 31 on the cover, to which a work circuit may be attached as indicated by a plug 32. Charging currents may also be applied through this receptacle.

When the cover 14, with its attached armature, is fastened to the generator casing, by cover screws 34, the armature enters the armature channel. Turning the hand wheel 27 will adjust the air gap, and if the armature is progressed inwardly far enough, the air gap will be entirely closed.

If, as is preferable, the field magnets have been partially charged before assembly, the armature will align itself so that there is an armature coil extension under each salient pole, so that when the air gap is closed, a completed magnetic circuit is formed, through the armature core, for each of the magnets.

The field elements may then be fully charged by the passage of heavy currents through the armature coils. It is customary, however, to wind the armature coils of fairly small diameter wire, and, as such, the coils will not stand charging currents sufficient to fully charge the magnets. It is therefore necessary to charge with instantaneous currents of high amperage in order that the coils be not harmed.

I prefer to supply such currents from a circuit shown diagrammatically and reduced to lowest terms in Figure 3. A D. C. generator 35 feeds the primary 36 of a step down transformer having a very heavy core 37 and a low resistance secondary 38.

A vacuum break 39 is included in the primary circuit, which comprises an evacuated vessel enclosing a pair of soft iron arms 40—40 normally contacting a connector 41. A solenoid 42 is slipped over the break, and when energized by a source of current 43 the arms magnetize, repel each other, and break the primary circuit.

In operation, the air gap in the generator is closed, and the armature, as indicated in the diagram by the numeral 44, is connected to the secondary 38 of the transformer. A hand operated switch 45 starts current flowing through the primary 36, and after allowing time for the core 37 to build up as high as possible, a solenoid circuit switch 46 is closed, the primary circuit is broken by the action of the vacuum break 39, and a heavy instantaneous current will flow in the secondary due to the field collapse in the core 37. This heavy current passes through the armature coils without heating them, and the magnets are fully charged. The air gap is then restored and the alternator is ready for use.

I have found that 2000 amperes may thus be passed through the coils when wound with only number 18 wire without damage.

The coning of the opposed elements does not in any way affect the efficiency of the alternator, and the field magnets may be recharged at any time simply by closing the air gap, charging and restoring the air gap, without dismounting the generator.

The magnetic circuit is also never completely broken, as only the original air gap is placed in the magnetic circuit, and the armature need never be completely removed.

I claim:

1. The method of charging the permanently magnetizable elements of a magneto having a field member and an armature with a small air gap therebetween, which comprises closing said air gap to complete the magnetic circuit of said magnetizable elements through the armature core, passing a heavy instantaneous charging current through the armature coils, and opening said air gap to its original amount.

2. The method of charging the permanently magnetizable elements of a magneto having a field member and an armature with a small air gap therebetween, which comprises closing said air gap to complete the magnetic circuit of said magnetizable elements through the armature core, passing an instantaneous charging current through the armature coils, said current being many times greater than said coils can carry continuously without over-heating.

3. In combination, a magneto comprising a rotating field member, including permanently magnetizable elements, having a plurality of salient poles, an armature including a core, core extensions on said core, and armature coils on said extensions, said core extensions being located adjacent said salient poles with an air gap therebetween, and means for opening and closing said air gap.

4. The method of charging the permanently magnetizable elements of a magneto having a field member and an armature with a small air gap therebetween, which comprises closing said air gap to complete the magnetic circuit of said magnetizable elements through the armature core, passing an instantaneous charging current through the armature coils, said current being many times greater than said coils can carry continuously without over-heating, greater than said coils can normally carry without heating.

PHILIP F. SCOFIELD.